United States Patent
Shank

Patent Number: 5,390,988
Date of Patent: Feb. 21, 1995

[54] AIR BRAKE PILOT ADAPTOR

[75] Inventor: Donald B. Shank, Duluth, Minn.

[73] Assignee: Duluth & Iron Range Co., Inc., Duluth, Minn.

[21] Appl. No.: 12,303

[22] Filed: Feb. 2, 1993

[51] Int. Cl.$^6$ ............................................. B60T 7/00
[52] U.S. Cl. .................................. 303/15; 303/37; 303/69
[58] Field of Search .......... 303/3, 15, 20, 40, 28, 303/35, 36, 37, 39, 68, 69

[56] References Cited

U.S. PATENT DOCUMENTS

| | | | |
|---|---|---|---|
| 2,040,312 | 5/1936 | Ickes et al. | 303/15 |
| 2,136,577 | 11/1938 | Campbell | 303/15 |
| 2,897,011 | 7/1959 | Cotter | 303/16 |
| 2,937,907 | 5/1960 | Harris et al. | 303/16 |
| 3,260,553 | 7/1966 | Jeffrey | 303/16 |
| 3,653,723 | 4/1972 | Worbois | 303/20 |
| 4,021,079 | 5/1977 | Bohusch | 303/3 |
| 4,052,110 | 10/1977 | Banker | 303/36 |
| 4,125,293 | 11/1978 | Hart | 303/37 |
| 4,264,110 | 4/1981 | Washbourn et al. | 303/17 |
| 4,598,953 | 7/1986 | Wood et al. | 303/36 X |
| 4,904,027 | 2/1990 | Skantar et al. | 303/15 |
| 5,104,203 | 4/1992 | Ferri | 303/15 |

OTHER PUBLICATIONS

Freight Car Brake Equipment With ABD Control Valve Instruction Pamphlet G-g5062-16, Aug. 1969 (Westinghouse Air Brake Co.).

*Primary Examiner*—Robert J. Oberleitner
*Assistant Examiner*—Lee W. Young
*Attorney, Agent, or Firm*—Nawrocki, Rooney & Sivertson

[57] ABSTRACT

A pilot mechanism for improving operation of various functions of the pneumatic brake of a train. The mechanism includes solenoid valves, controllable by either a radio/battery mode of operation or a train wire system mode of operation. The solenoid valves can be interposed in various passages in fluid communication with passages of a conventional ABD control valve, as modified to enable operation of the invention, to permit substantially immediate venting of air in those passages to atmosphere.

10 Claims, 7 Drawing Sheets

AIR BRAKE PILOT ADAPTOR

TECHNICAL FIELD

The invention of this document deals broadly with vehicle operation and control systems. More specifically, however, it deals with a pilot device, retrofitable to an ABD control valve system and other systems installed in a car of a train, for effecting generally uniform and substantially instantaneous application and releasing of air brakes among the various cars of the train in which the pilot device is installed. The focus of the invention is a simple and relatively inexpensive device which can be incorporated into existing air brake systems.

BACKGROUND OF THE INVENTION

Air brake systems are known in the prior art and have been used in freight train braking systems for a number of years. For various reasons, it is particularly desirable that the air brakes of multiple cars in a train be applied and released generally uniformly and substantially instantaneously. Among these reasons are to deter and, if possible, eliminate property damage, bodily injury, and even possible loss of life which might occur as a result of non-uniform and/or sequential (that is, "domino effect") application and/or release of brakes among the various cars. Such non-uniform and sequential brake application and/or release can, if it becomes exaggerated, lead to damage of cars, derailment, significant property damage, and even personal injury or loss of life.

A rudimentary air brake comprises a piston housing having a piston disposed reciprocally therein. The piston stem is stepped to accommodate a graduating valve and to provide for engagement, by a shoulder of the piston stem, of a slide valve, both of which are received within the housing. Fluid communication exists between the housing, at a location remote from an end of the housing into which air from a brake pipe is introduced, and an auxiliary reservoir.

During normal operation of the train, air in the brake pipe maintained at a defined pressure enters the piston housing through a port at one end thereof. In this condition, air from the brake pipe engages the face of the piston to move the piston to one end of a throw along which the piston reciprocates. With the piston in this position, known as the charging position, air passes around the circumferential extremity of the piston face and passes throughout the piston housing and into the auxiliary reservoir. The auxiliary reservoir will become charged substantially to the same pressure as that in the brake pipe.

When the engineer desires to activate the air brake, pressure in the brake pipe is decreased by manipulation of an automatic brake valve in the locomotive. The reduction of pressure in the brake pipe is, in turn, sensed at the face of the piston in the housing. As a result, pressure in the auxiliary reservoir will be at a higher level than that in the brake pipe and that sensed at the face of the piston. As a result, the pressure in the auxiliary reservoir will serve to urge the piston within its housing in a direction toward a port through which pressure in the brake pipe is introduced into the housing.

The slide valve is provided with a channel which is, initially, obstructed by the graduating valve seated within a recess formed within the stem of the piston. As the piston face moves, however, it drags the stem and, concurrently, the graduating valve to open a port to allow pressure from the auxiliary reservoir to enter into the channel through the slide valve. The slide valve is, in turn, moved by the piston stem to a location in which the channel through the slide valve is in communication with both the interior of the piston housing (and the auxiliary reservoir), on the one hand, and a pipe to the brake cylinder, on the other. When the brake assembly achieves this configuration, it is said to be in an application position. Air passes from the auxiliary reservoir, through the housing, through a pipe, and into the brake cylinder to urge the brake piston, to overcome a bias, to a location at which the brake will be applied.

Discharge of air within the auxiliary reservoir/piston housing assembly to the brake cylinder will result in a reduction of pressure within the auxiliary reservoir/piston housing assembly. As this occurs, the piston head and attached stem will be urged away from the application position back toward a location intermediate the charging position and the application position. The piston stem, concurrently, drags the graduating valve along with it. The slide valve, however, remains, when the piston is in the lap position, in the same location it occupies when the assembly is in the application position. With this relationship of the various components, pressure will be maintained in the brake cylinder, since the graduating valve obstructs escape of air in the cylinder and its charging pipe through the channel formed in the slide valve. Lap position will continue to be maintained as long as no adjustment to air pressure in the brake pipe is made.

When the engineer desires to release the brake, the automatic brake valve within the locomotive will be manipulated to increase pressure in the brake pipe. This increased pressure acts upon the face of the piston and functions to return the piston to its charging position. As the piston is moved toward its charging position, a shoulder defined within the piston which is intended to engage the slide valve does, in fact, so engage the slide valve. As the slide valve is drawn back to the location it occupies in the charging position, ports are brought into registration with one another through the slide valve, to effect exhaust of the air in the brake cylinder. As the air is exhausted from the cylinder, the brake piston is returned to its withdrawn position to release the brake. It will be understood that the level to which the engineer increases the brake pipe pressure is that at which it was originally maintained (that is, the predetermined pressure maintained at the charging position) at which discussion of the braking cycle initiated.

The discussion of the prior art at this point has been restricted to a train car having an air brake system installed therewithin. It will be understood, however, that when multiple cars comprise the overall train, each individual car will have a substantially identical braking system installed. The braking system of each car is serviced by a common brake pipe extending the length of the train. As will be understood in view of this disclosure, "sequential" application and releasing of brakes of cars along the line will, to some extent, occur. This results from pressure reduction conveyance along the brake pipe and other factors.

It will be understood that the system described hereinbefore is rudimentary. Consequently, any problems inherent in such a system would be exacerbated.

In recognition of the lack of refinements and fine-tuning resulting in less than a perfect air brake system, various attempts have been made to improve upon the basic system. One improved structure is embodied in a component of a freight car braking system known as the ABD control valve. That product is one developed by the Westinghouse Air Brake Co. over twenty-five years ago. That product is described in detail in Westinghouse Air Brake Co.'s INSTRUCTION PAMPHLET G-g-5062-16 of August 1969. It will not, therefore, be discussed in detail herein other than to the extent that it is described in the DETAILED DESCRIPTION OF THE INVENTION portion of this document in .illuminating the structure and operation of the present invention. The disclosure of INSTRUCTION PAMPHLET G-g-5062-16 of August 1969 is incorporated herein by reference.

It will be understood that the "SERVICE PORTION" described and illustrated in that Westinghouse document operates generally on the same principles as the basic system described hereinbefore. In the case of the ABD control valve, pressure in the brake pipe is not allowed to pass around the face of the piston in order to effect charging of the auxiliary reservoir. In fact, the face of the piston is sealed by diaphragm, and the air from the brake pipe merely operates on the face of the piston to move slide valves carried by the piston to effect registration of various ports and passageways to charging of the auxiliary reservoir and an emergency reservoir, and other functions. For example, as the piston is moved, a graduating valve carried thereby closes the port of communication between the brake pipe and the auxiliary reservoir as the ABD control valve moves from a charging configuration toward an application configuration.

Having specified these differences, however, it should again be pointed out that the ABD control valve functions substantially on the same principles as the basic system. As a result, initiation and functioning of the braking process are governed by the variation of the brake pipe pressure. Consequently, while some improvements over the basic system are achieved, there are still inherent deficiencies in the ABD control valve. Certainly, it does not provide for generally uniform and substantially instantaneous application and releasing of the brakes of all cars within a train.

It is to these dictates and problems of the prior art that the present invention is directed. It is an adaptor which is able to be used to retrofit an ABD control valve and other braking equipment structures to overcome problems of the prior art.

SUMMARY OF THE INVENTION

The present invention is a braking system applicable for use in railroad trains wherein each car employs an ABD-type control valve as described in Westinghouse Air Brake Co. INSTRUCTION PAMPHLET G-g5062-116 of August 1969. The invention incorporates a block, electro-pneumatic in configuration, which is retrofitable to the fully pneumatic ABD control valve. The block is mounted to the control valve between the service slide valve portion and an accelerated release valve portion of the control valve. The block incorporates a pair of miniature solenoid valves which serve to interrupt and vent air flow in various passages in the control valve. As such, the retrofitable adaptor block accomplishes a "pilot" function.

In view of the nature of the block adaptor, only extremely minor alterations need be made to the basic ABD control valve, and these alterations are merely to permit mounting of the block in accordance with the present invention in a manner so that ports therein are able to be registered with passages in the control valve. It follows that all pneumatic functions of the basic control valve remain substantially unchanged.

In retrofitting an ABD control valve in a manner in accordance with the present invention, an insert to the valve housing would be provided along with gasket material and four replacement bolts. The block adaptor is, in turn, mounted to the insert with ports therein in registration with passages in the adaptor.

The miniature solenoid valves are, of course, actuated electrically. Actuation could be accomplished by one or both of radio/battery or "train wire system" modes. Typically, both modes could be employed to provide back-up operation. Either or both of the modes would be initiated by the engineer at a master control panel in the locomotive. Typically, the controls for the miniature solenoid valves, whether actuation was implemented in a radio/battery mode or a "train wire system" mode, would be slaved to the automatic brake valve. As a result, functioning of the pilot adaptor would automatically be coordinated with the operation of the automatic brake valve to govern operation of the ABD control valve. Consequently, the engineer need not be concerned about performance of multiple functions.

It is an object of the present invention to provide for a retrofit structure, which, when used in combination with an ABD control valve as known in the prior art, effects substantially instantaneous and simultaneous application and release of the brakes of multiple cars of a train. It is also an object of the present invention to provide a structure for accomplishing this objective which is simple and inexpensive.

It is also an object of the present invention to provide structure which will allow the release of a stuck brake. It is also an object of the present invention to provide a structure which will allow a graduated release of the train brake. It is also an object of the present invention to provide a structure which will allow an accelerated direct release of the train brake.

It is also an object of the present invention to allow the continued use of the in-place pneumatic brake system in the event of a malfunction in the electrical transmission system of the retrofit structure. Further, it is an object of the present invention to allow a relatively uniform and instantaneous operation of the electro-pneumatic brake system even though several individual cars dispersed through the train may have inoperative electrical components.

The present invention is thus a structure which effects braking of the cars in a train in an improved fashion over the methods known in the prior art. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
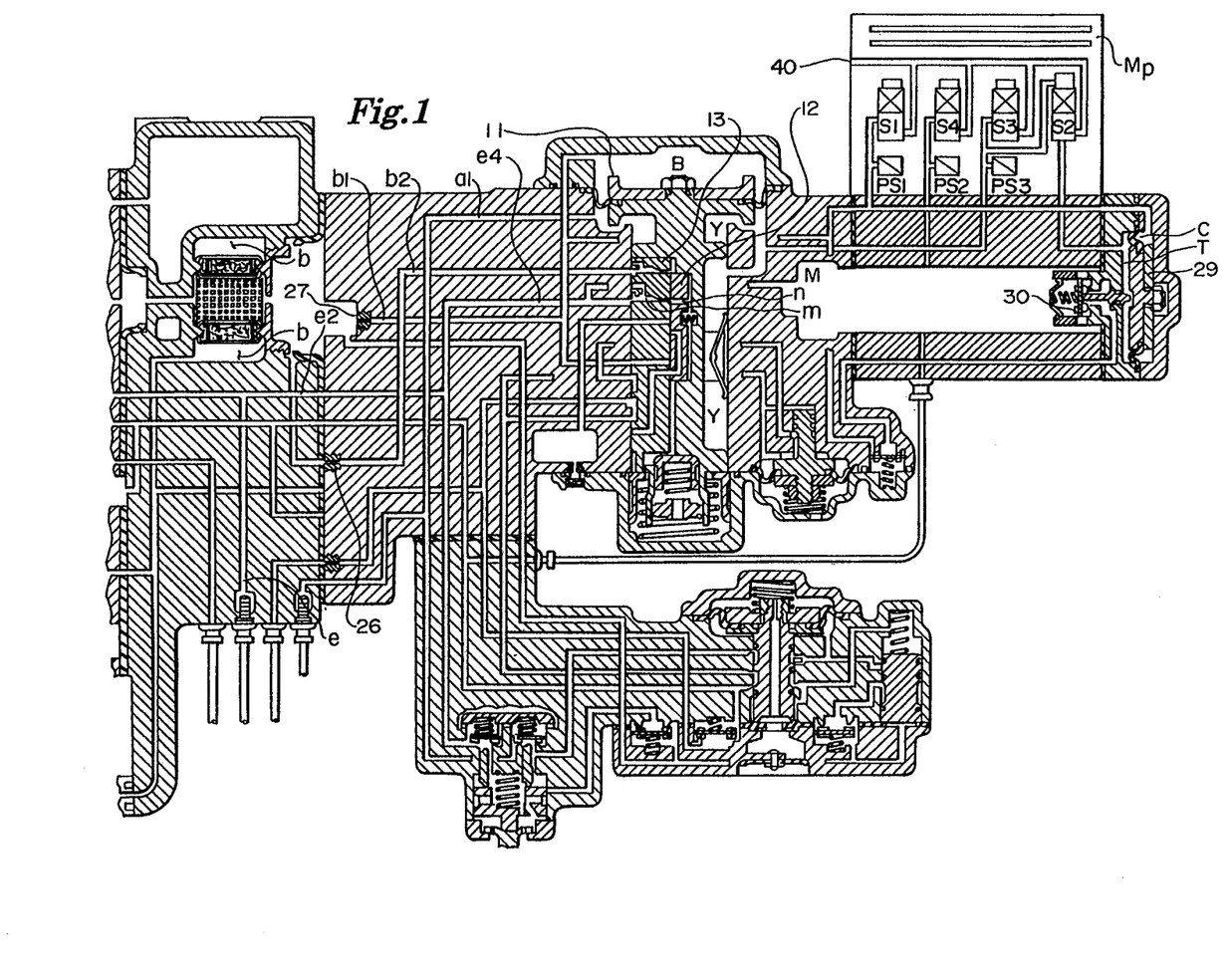
FIG. 1 is a schematic sectional elevational view of the service portion of an ABD control valve, retrofitted with the pilot device in accordance with the present invention, in charging position.

Referring now to the drawings wherein like reference numerals denote like elements throughout the several views, FIG. 1 illustrates the braking system employing the present invention with components in a charging position. With the various components as indicated in FIG. 1, brake pipe air flows from the locomotive 50 through the line of train cars through axially-aligned brake pipe segments of each car which are in fluid communication with each other. Within each car, a pipe segment diverges from the brake pipe segment to provide air to the control valve at the designated pressure. The air passes from the pipe segment through a combined dirt collector and cut-out cock and into a strainer and chamber b. The brake pipe air, thereafter, flows, in the service portion of the control valve, through choke 27 and passage b1 to a chamber B, a wall of which includes the face of the service diaphragm piston 11. Brake pipe air also passes through chamber C of an accelerated release valve diaphragm piston 29. Passage of brake pipe air to chamber C is through a passage in which is a disposed application solenoid valve S1 and a pressure sensor PS1.

The auxiliary reservoir (not shown) is charged through chamber Y which is connected to the auxiliary reservoir through passage a1. Choke 26 in passage b2 controls the rate at which chamber Y is charged. As a result, Chamber B is charged at a faster rate, and the service diaphragm piston is, thereby, maintained in release position. As a result, the slide valve 13 and graduating valve 12 are also in release position.

Auxiliary reservoir air in chamber Y flows through release solenoid valve S2 to chamber T on the auxiliary reservoir air side of piston 29. As in the case of chambers B and Y, the auxiliary reservoir air pressure is initially lower than the brake pipe air pressure in chamber C because of controlling rates of charging by appropriate choking mechanisms.

Auxiliary air in chamber Y flows to the emergency reservoir (not shown) through aligned ports n, m in the service graduating and service slide valves, respectively, and through passages e4, e2 and e. When fully charged, pressure in the emergency reservoir, auxiliary reservoir, and brake pipe will be equalized. It should be noted that emergency reservoir air in chamber M surrounds accelerated release check valve 30. Accelerated release check valve 30 is shown in a closed position in FIGS. 1-4.

Figure 2:
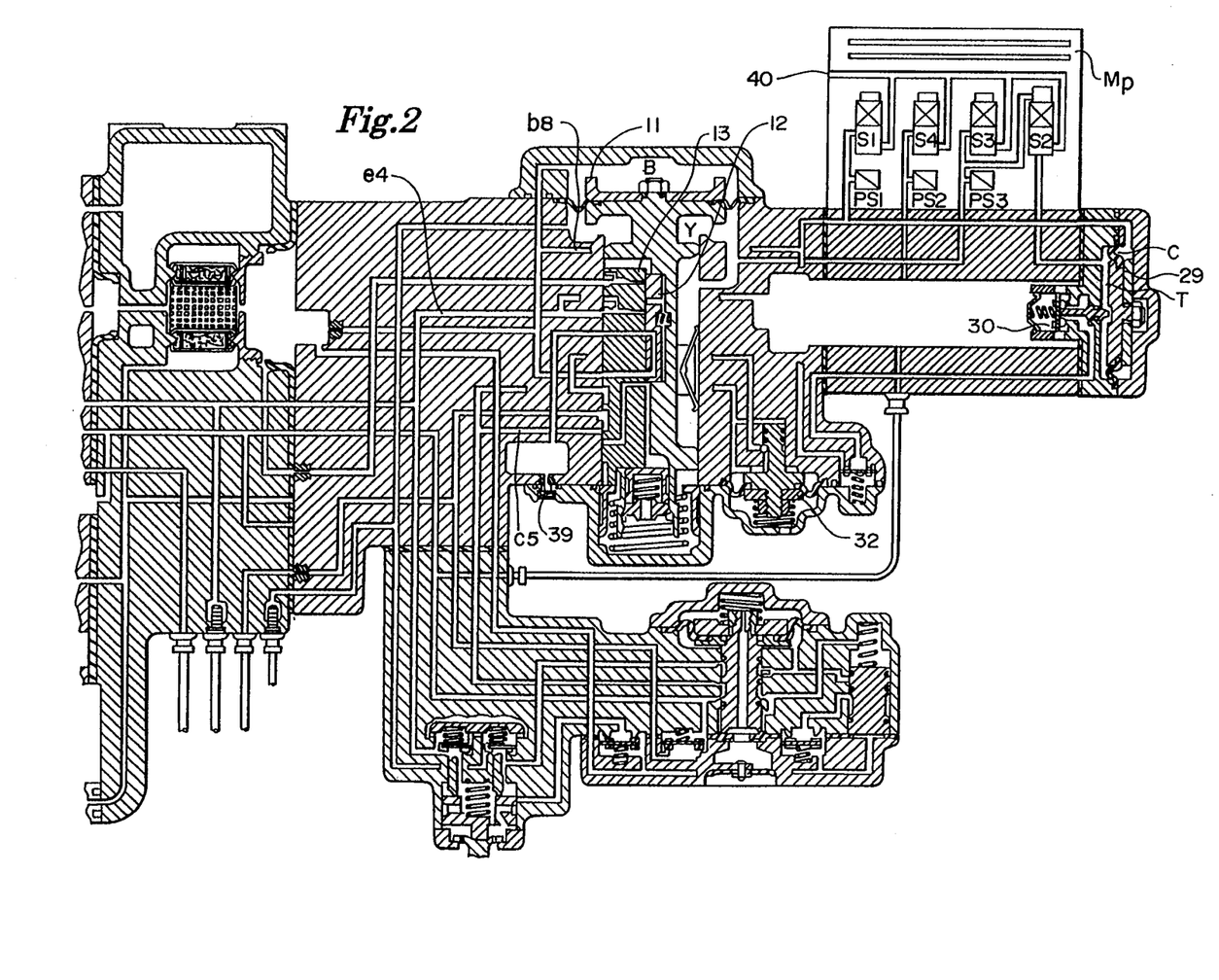
FIG. 2 is a view similar to FIG. 1 wherein the control valve is in preliminary quick service position.

Referring now to FIG. 2, when the engineer moves the automatic brake valve handle 52 in the locomotive 50 to the position corresponding to service position of the ABD control valve, such movement, in addition to accomplishing a number of things to be discussed hereinafter, functions to effect energization of application solenoid valve S1 as a result of valve S1 operation being slaved to manipulation of handle 52. This allows brake pipe air to be exhausted at a controlled rate through exhaust 40. Consequently, a local reduction of brake pipe air from passage b8 and chamber C and from the upper face of service diaphragm piston 11 result. The greater auxiliary reservoir pressure in chamber Y moves the service piston upward to allow service graduating valve 12 to connect the brake pipe air to the quick service volume and exhaust to atmosphere through choke 39.

Figure 3:
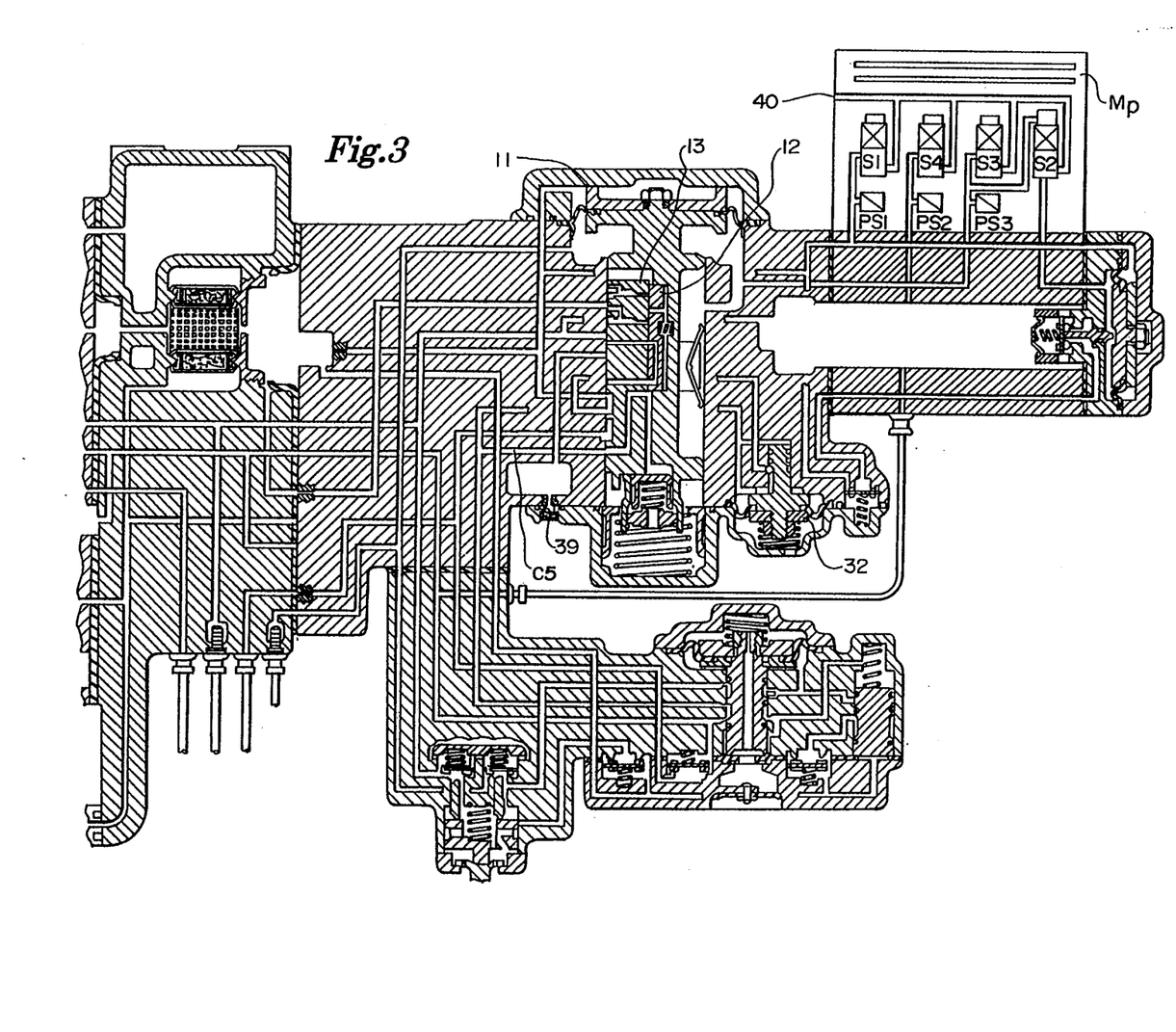
FIG. 3 is a view similar to FIG. 1 wherein the control valve is in service position.

Continued flow of brake pipe air through chokes 39 and exhaust 40 causes the service diaphragm piston 11 to move to service position, as illustrated in FIG. 3. With piston 11 in this position, auxiliary reservoir air flows past the service graduating valve 12 and through passage c5 and other passages in the control valve to the brake cylinder (not shown). A piston in the brake cylinder is biased away from an actuation position, for example, by a coil spring. As auxiliary reservoir air flows to the brake cylinder, it builds up pressure within the cylinder to force the piston, against the bias, to apply the brakes.

Brake pipe air also flows to the brake cylinder through quick service limiting valve 32. Such flow continues until the brake cylinder reaches 10 p.s.i. At that time, the limiting valve closes off further flow of the brake pipe air to the cylinder.

As the various components move to their service positions, egress of air from the emergency reservoir is cut-off by the service slide valve 13 which occludes the emergency reservoir's egress port. Emergency reservoir air, therefore, remains at the pressure to which it was charged previous to movement of the automatic brake valve.

When the desired brake pipe pressure reduction has been completed, manipulation of handle 52 causes manipulation of handle 52 causes the master controller 54 in the locomotive 50 to function to cause a break in the electric signal initiating movement of the application solenoid valve S1. As a result, venting of brake pipe air through exhaust 40 is terminated. Auxiliary reservoir air continues to flow, however, to the brake cylinder until the pressure in chamber Y is reduced to a level slightly below brake pipe pressure in chamber B. When this occurs, service graduating valve moves to what is known as "lap position" (shown in FIG. 4), and further flow of auxiliary reservoir air to the brake cylinder is cut-off. Emergency reservoir air flow through passage e4 remains precluded by the service slide valve 13.

When the engineer in the locomotive 50 wishes to release the brakes, he moves the automatic brake valve handle 52 to running or release position. This permits brake pipe air to flow into the train line brake pipe. As this movement of the automatic brake pipe handle 52 is accomplished, the master controller 54 is activated to effect energization of release solenoid valve S2. The release solenoid valve S2 moves to the position shown in FIG. 5. The small volume of air trapped in chamber T on the auxiliary reservoir air side of piston 29 is rapidly exhausted to atmosphere through exhaust port 40. Brake pipe air on the opposite face of piston 29 effects immediate movement of the piston to the left, as viewed in FIG. 5. As a result of this movement, accelerated release check valve 30 unseats and permits emergency reservoir air in chamber M which, as will be recalled, remained at the pressure to which it was charged previous to the brake application, to flow through check valve 38 and passages b8 and b1 to chamber B above service piston 11. The brake pipe pressure in chamber B has, again, become greater than the auxiliary reservoir pressure in chamber Y, and the service slide valve is forced to release position. This permits cavity t in the slide valve 13 to connect the brake cylinder to exhaust at a retainer. The brakes are, thereby, released.

Figure 5:
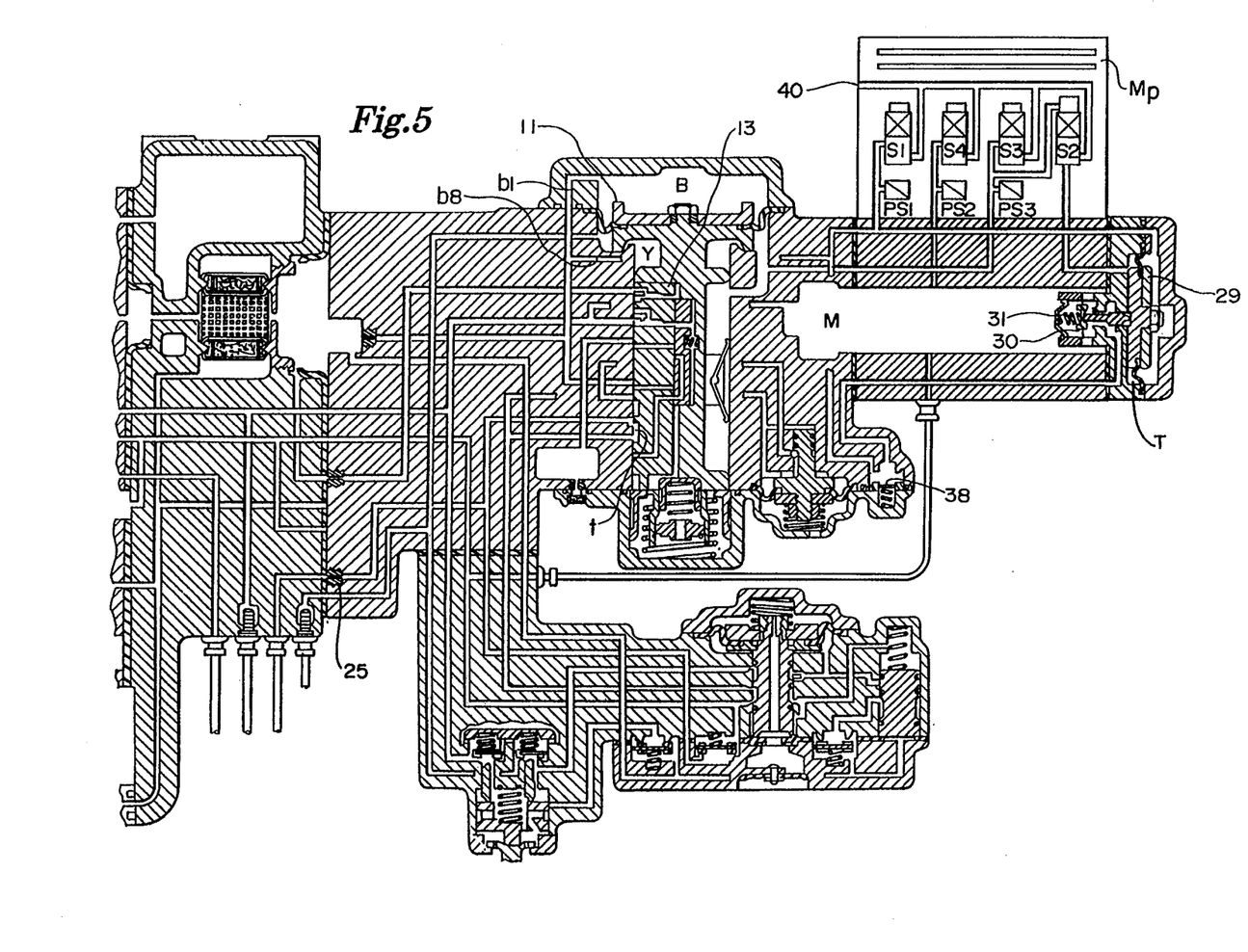
FIG. 5 is a view similar to FIG. 1 wherein the control valve is in release and recharge position or in accelerated direct release position.
Figure 6:
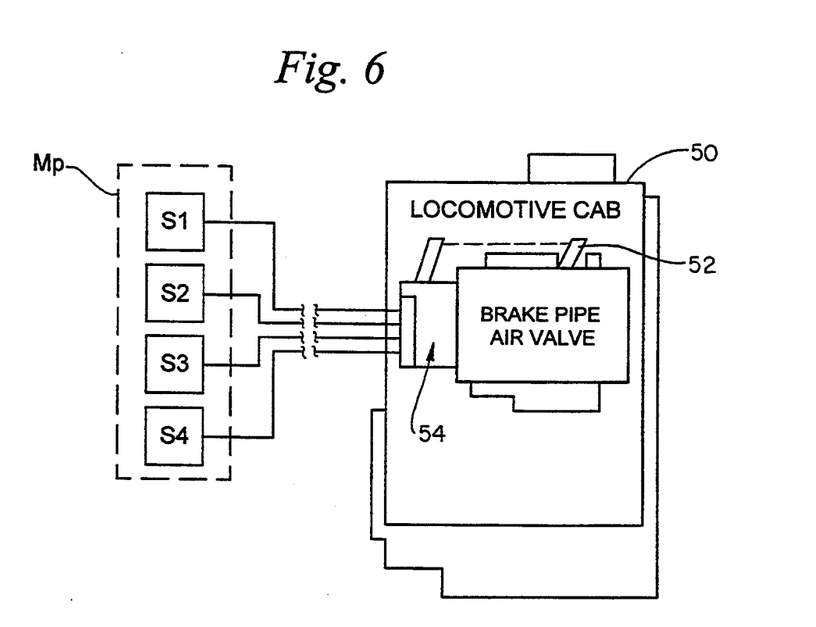
FIG. 6 is a schematic view illustrating a first control means embodiment.
Figure 7:
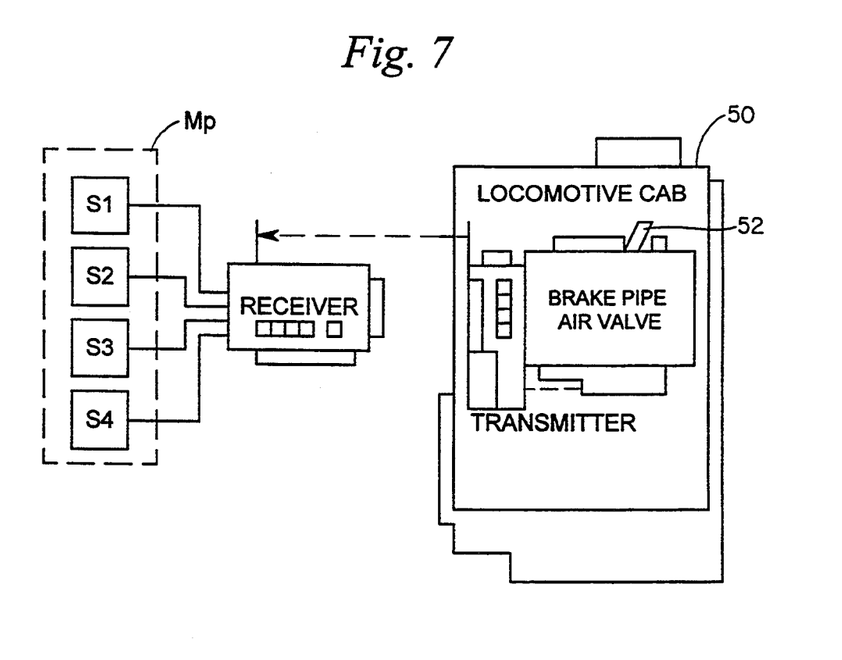
FIG. 7 is a schematic view illustrating a second control means embodiment.

As this is occurring, brake pipe air from the locomotive continues to flow through the train Line holding the service pistons in release positions while recharging the reservoirs.

It is notable that the release solenoid valve S2 can be energized for a relatively short period of time (i.e., 3 to 4 seconds), and a relatively instantaneous release of brakes will occur. The presence and operation of valve S2 significantly decreases the period of time necessary to effect brake release, and release will occur substantially simultaneously throughout all cars of the train.

When release solenoid valve S2 is de-energized, auxiliary reservoir air is, again, permitted to enter chamber T on the auxiliary reservoir air side of the accelerated release piston 29. When brake pipe pressure and auxiliary reservoir air pressure on opposite sides of piston 29 are nearly equal, check valve 30 automatically returns to its closed position. This occurs as a result of the action of biasing spring 31.

As will be seen in view of this disclosure, the operation of an ABD pneumatic control valve retrofitted in accordance with the present invention will operate substantially in the same manner as will such a valve which has not been retrofitted. Accomplishment of braking and releasing of brake functions, however, will occur substantially more rapidly when the present invention is incorporated than when it is not.

Figure 4:
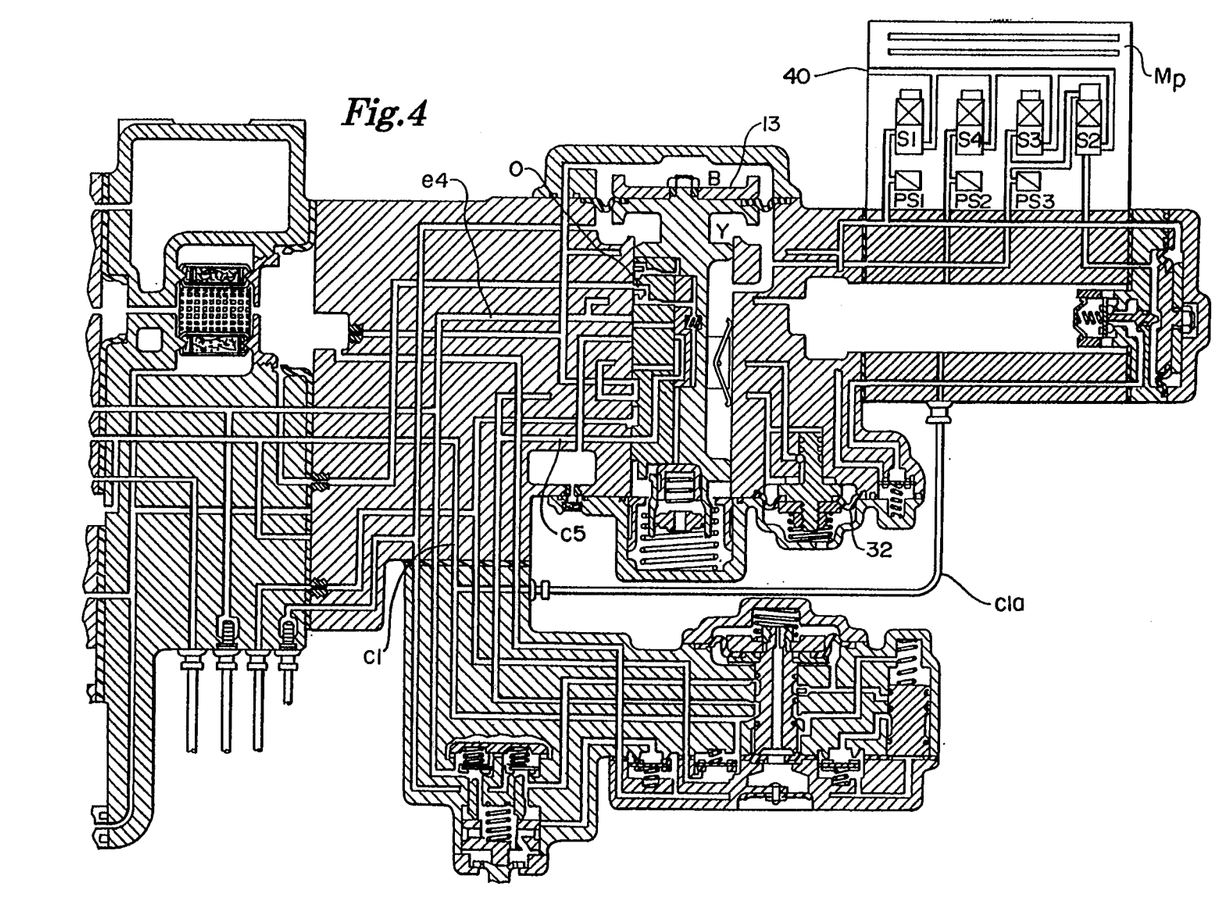
FIG. 4 is a view similar to FIG. 1 wherein the control valve is in either lap position, stuck brake condition or graduated release position.

FIG. 4 illustrates the position that solenoid S3 and pressure sensor PS2 occupy in a stuck brake condition. Solenoid S3 and pressure sensor PS2 are located in the manifold of the block adaptor and are connected to brake cylinder passage c1 by means of small tube c1a. FIG. 4 shows the service piston 11 and service slide valve 13 in service lap position, the position in which the vast majority of stuck brakes occur.

As described previously in the BACKGROUND OF THE INVENTION, when the engineer desires to release the brakes, the automatic brake valve will be manipulated to increase pressure in the brake pipe. This increased pressure acts upon the face of the piston and functions to return the piston to its release and charging position. As the piston, together with its slide valve, is moved to release and charging position, ports are brought into registration with one another (through the slide valve) to effect exhaust of the air in the brake cylinder. As the air is exhausted from the cylinder, the brake piston is returned to its withdrawn position to release the brake.

On occasion, due to a slow build-up of the brake pipe pressure on a long train, a car with a defective brake caused by air leakage in the control valve, excessive slide valve friction or other malfunction, may not release. In this situation, the slide valve remains in service lap position, thereby preventing the air in the brake cylinder from exhausting to atmosphere. This, by far, is the most common cause of a stuck brake.

Referring now to FIG. 4, which illustrates the braking system employing the present invention with components shown in an abnormal service lap position, brake cylinder air in passage c5 is out of registration with the exhaust passage leading to the exhaust at the retainer. The precondition for a stuck brake occurs when the initial build up of brake pipe pressure in Chamber B fails to move the service slide valve from service lap position to release and charging position. During this critical period, brake pipe air will continue to flow into Chamber Y below the service piston through passage b2 and slide valve stabilizing breather port o. Any brake pipe leakage past the service slide valve will contribute to the eventual equalization of brake pipe air in chamber B with the auxiliary reservoir air in Chamber Y. In this situation, nothing in the prior art is capable of releasing the brake pneumatically. Subsequent brake pipe reductions will add to the pressure build up in the brake cylinder, resulting in slid flat wheels and possible derailment. Upon visual detection, which is particularly difficult during the hours o#darkness, the train must be stopped to allow the air in the brake cylinder to be released manually. At the same time, the brake system of the car must be cut out manually by closing the brake pipe cut-out cock. If the car is safe to move, it must be set out at the next terminal where repairs can be made.

The present invention employs a microprocessor Mp as part of the adaptor package. In conjunction with a computer on the locomotive, the microprocessor continuously monitors the functions of each car's brake system, including a stuck brake condition. The pressure sensor PS2 electronically reports the pressure in the brake cylinder of each car, thus informing the locomotive engineer whether or not the train brakes are applied or released. When the train brakes are in the release mode, a stuck brake condition is quickly and easily detected by the brake cylinder pressure sensor PS2 on the defective car. Since the computer has memorized the location of each car in the train sequentially, the computer allows the engineer to isolate the defective brake for remedial action. By closing a switch on the locomotive, the microprocessor on the specific car will act to energize solenoid S3 which will move to open position, allowing the auxiliary reservoir air to exhaust to atmosphere through exhaust 40. The sudden reduction of auxiliary reservoir air in chamber Y below service diaphragm piston 11 allows the greater brake pipe pressure in chamber B to force the piston and service slide valve 13 to release position (FIG. 5) where exhaust cavity t in the slide valve connects the brake cylinder passages to the exhaust at the retainer. When the brake cylinder pressure drops a predetermined amount (an indication that the service slide valve has returned to release position), the microprocessor will automatically deenergize solenoid valve S3, thus limiting the reduction of auxiliary reservoir air to the minimum level necessary to release the brake.

FIG. 4 also illustrates the position that solenoid S4 and pressure sensor PS2 occupy when in graduated release position. Solenoid S3 and pressure sensor PS2 are located in the manifold of the block adaptor and are connected to brake cylinder passage c1 by means of small tube c1a. FIG. 4 shows the service piston 11 and slide valve 13 in service lap position, which holds air pressure in the brake cylinder following a service brake application. With the service slide valve in lap position, nothing in the prior art will allow a graduated release of the brakes. With the present invention, the engineer can make a graduated reduction of brake cylinder pressure by actuating solenoid S4, which will connect brake cylinder passage c1 to the atmosphere at exhaust 40. This action will allow a graduated release of brake cylinder pressure in controlled increments down to 10 pounds, the setting of the quick service limiting valve 32. The final 10 pounds can be released by actuating solenoid S2, as shown in the normal release and recharge position (FIG. 5). The graduated release feature will provide significant benefits when stopping and when braking on undulating, descending grades.

FIG. 5 illustrates the position that solenoid S4 and pressure sensor PS2 occupy when in accelerated direct release position. When releasing the brake, either pneumatically or electro-pneumatically, all of the air in the brake cylinder must pass to the atmosphere through restricted exhaust choke 25. To facilitate a faster release, solenoid S4 is activated to allow brake cylinder air in passage c1 and c1a to release directly to atmosphere through exhaust 40. The rapid discharge of air through exhaust 40 supplements the exhaust of brake cylinder air through restricted choke 25, thus effecting an accelerated release of the brakes.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. In combination with a pneumatic control valve used in a car in tandem with the locomotive of a train to effect applying and releasing of a pneumatic brake of the car in response to variation, from the locomotive, of gas pressure in a brake pipe extending the length of the train, wherein applying of the brake involves normally venting of gas, previously provided to a first chamber defined on one side by a first face of a service diaphragm piston, a second chamber defined on one side by a first face of an accelerated release diaphragm piston, and a passage interconnecting the first and second chambers, from the first and second chambers and the interconnecting passage through a quick service volume choke; apparatus for expediting venting of the gas from the first and second chambers and the interconnecting passage to substantially immediately effect applying of the brake, comprising:

(a) a valving member having a first passage formed therein, said first passage formed in said valving member being operatively connected to one of the pneumatic control valve passage interconnecting the first and second chambers and the first and second chambers, so as to be in fluid communication therewith, and a first port affording exhaust egress from said first passage formed in said valving member;

(b) a first valve element mounted in said valving member for movement between a first position occluding said first port, and a second position wherein gas in said first passage formed in said valving member is exhausted through said first port; and (c) control means, segregated from gas pressure in the brake pipe, for accomplishing movement of said first valve element between said first and second positions thereof.

2. Apparatus in accordance with claim 1 wherein said control means is coordinated with means, in the locomotive, for varying gas pressure in the brake pipe, wherein, as gas pressure in the brake pipe is reduced to effect applying of the brake, said control means effects movement of said first valve element from its first position to its second position.

3. Apparatus in accordance with claim 2 wherein said control means includes electric actuation means.

4. Apparatus in accordance with claim 3 wherein said electric actuation means comprises:

(a) a radio transmitter in the locomotive; and (b) a radio receiver carried by the valving member.

5. Apparatus in accordance with claim 3 wherein said electric actuation means comprises an electric transmission wire extending from the locomotive to the valving member.

6. Apparatus in accordance with claim 1 wherein releasing of the brake involves normally reducing pressure of gas, previously provided to a third chamber defined, on one side, by a second face of the service diaphragm piston, a fourth chamber defined, on one side, by a second face of the accelerated release diaphragm piston, and a passage interconnecting the third and fourth chambers, relative to pressure of gas in the second chamber; said apparatus further including means for substantially immediately accomplishing releasing of the brake including a second passage formed in said valving member, said valving member second passage being disposed so that it is in fluid communication with said passage interconnecting said third and fourth chambers, a second port, at an end of said second passage in said valving member opposite an end intersecting said passage interconnecting said third and fourth chambers, through which gas in said fourth chamber can be vented, and a second valve element mounted in said valving member and disposed for movement between a first position, wherein said second valve element occludes said second port of said valving member and permits flow through said passage interconnecting said third and fourth chambers, and a second position affording egress of gas in said fourth chamber through said second port while concurrently occluding venting of gas from said third chamber.

7. Apparatus in accordance with claim 6 further comprising control means, segregated from gas pressure in the brake pipe, for accomplishing movement of said second valve element between said first and second positions thereof.

8. Apparatus in accordance with claim 7 wherein said control means is coordinated with means, in the locomotive, for varying gas pressure in the brake pipe, wherein, as gas pressure in the brake pipe is increased to effect releasing of the brake, said control means effects movement of said second valve element from its first position to its second position.

9. Apparatus for substantially immediately accomplishing applying and releasing of pneumatic brakes of multiple cars of a train in tandem with a locomotive, wherein a plurality of cars of the train are equipped with a pneumatic control valve for normally effecting applying of the brake by venting of gas, previously provided to a first chamber defined, on one side, by a first face of a service diaphragm piston, a second chamber defined, on one side, by a first face of an accelerated release diaphragm piston, and a passage interconnecting the first and second chambers, from the first and second chambers and the interconnecting passage through a quick service volume choke, and for normally effecting releasing of the brake by reducing pressure of gas, previously provided to a third chamber defined, on one side, by a second face of the service diaphragm piston, a fourth chamber defined, on one side, by a second face of the accelerated release diaphragm piston, and a passage interconnecting the third and forth chambers, relative to pressure of gas in the second chamber; said apparatus comprising:

(a) a valving member having first and second passages formed therein, said first passage formed in said valving member being operatively connected to the pneumatic control valve passage interconnecting said first and second chambers so as to be in fluid communication therewith, a first port affording exhaust egress from said first passage formed in said valving member, said second passage being operatively connected to the pneumatic control valve passage interconnecting said third and fourth chambers so as to be in fluid communication therewith, and a second port affording exhaust egress from said second passage formed in said valving member;

(b) a first valve element mounted in said valving member for movement between a first position occluding said first port and a second position wherein the gas in said first passage formed in said valving member is exhausted through said first port;

(c) a second valve element mounted in said valving member for movement between a first position, wherein said second valve element occludes said second port of said valving member and permits flow through said passage interconnecting said third and fourth chambers, and a second position affording egress of gas in said fourth chamber through said second port while concurrently occluding venting of gas from said third chamber; and (d) control means, segregated from gas pressure in the brake pipe, for accomplishing movement of said first valve element from said first position thereof to said second position thereof as gas pressure in the brake pipe is reduced to effect applying of the brake, and for accomplishing movement of said second valve element from said first position thereof to said second position thereof as gas pressure, previously provided to the third chamber, the fourth chamber, and the passage interconnecting the third and fourth chambers is reduced relative to pressure of gas in the second chamber to effect releasing of the brake.

10. Apparatus for expediting actuation of various functions of a conventional ABD control valve including application of brakes, release of brakes, and disengagement of stuck brakes, wherein normal actuation of the functions results from venting of gas from at least one chamber or passage of the convention control valve, said apparatus comprising:

(a) a valving member having at least one passage formed therein, a passage of the valving member being in fluid communication with a chamber or passage of the conventional control valve from which gas is vented to effect a particular function;

(b) means, coordinated with normal operation of the conventional ABD control valve, for alternately occluding and affording egress through the passage in the valving member as gas in the control valve plumbing system is alternately restricted from egress and vented, respectively, from the control valve; and (c) means for controlling the alternate occlusion and affording egress means of said valving member in coordination with operation of the conventional ABD control valve, said controlling means operating independently of, but in coordination with, the functioning of the plumbing of the conventional ABD control valve.

* * * * *